Patented Aug. 5, 1952

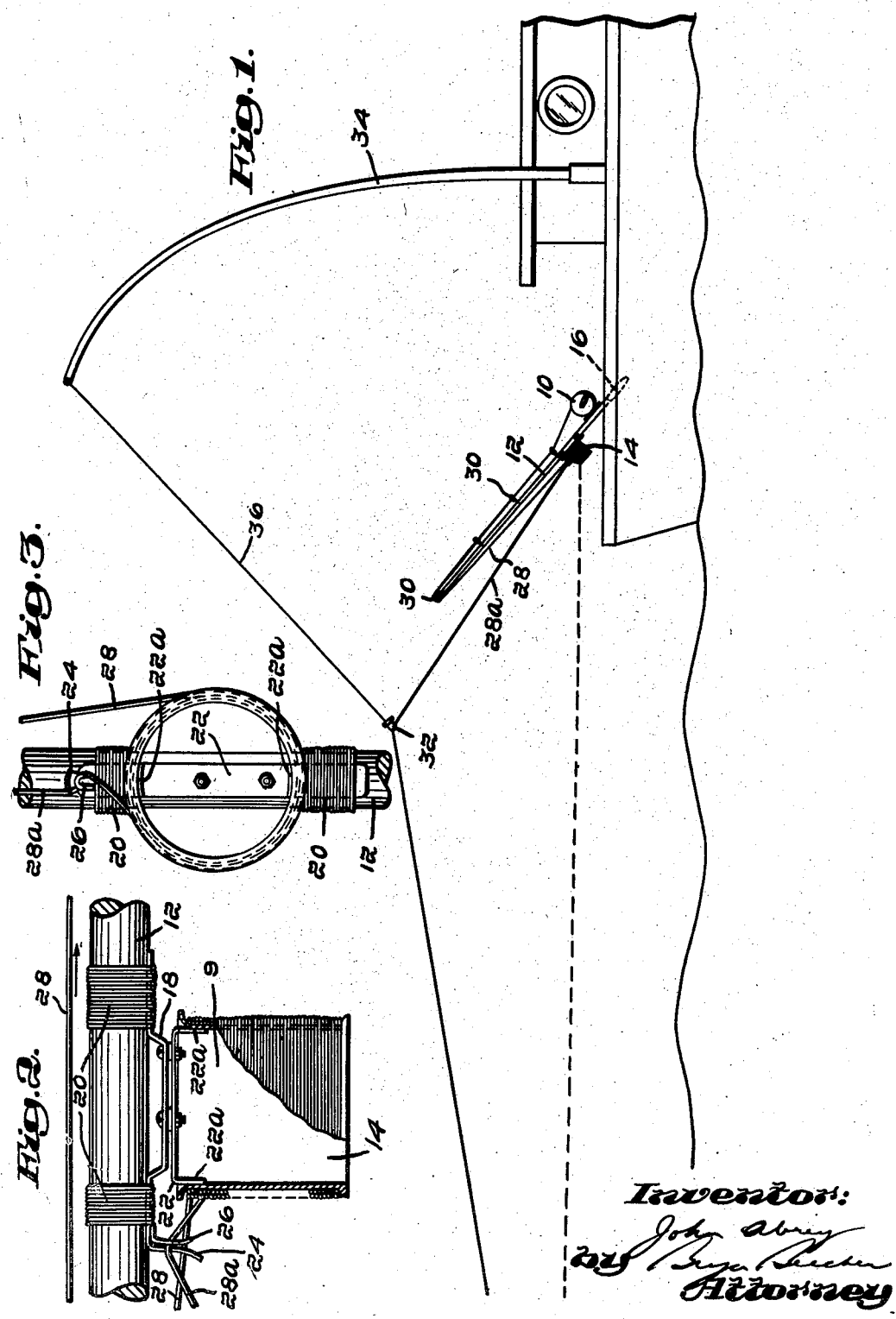

2,605,570

UNITED STATES PATENT OFFICE 2,605,570

FISHING GEAR

John Abrey, Honolulu, Territory of Hawaii

Application December 19, 1950, Serial No. 201,570

1 Claim. (Cl. 43—25)

My invention relates to an improvement in fishing gear, particularly fishing gear used in big game trolling, and has for its principal object to provide for the introduction of a time delay mediate the striking of the fish and the bringing of the fishing line under tension via the reel.

Such a time delay is advantageous in that it substantially increases the chances of the hook becoming firmly embedded in the fish before the fish is played and is further advantageous in case the line is left unattended, as during meal-time or during inclement weather when it is desirable to seek the protection afforded by the cabin of the fishing boat.

I shall particularly describe my invention as applied to a rod and a reel used with an outrigger such as is conventionally employed to ease the strain on the fisherman. The description will proceed with reference to the accompanying drawings in which:

Fig. 1 is illustrative of the invention in use;

Fig. 2 is a detail view showing an auxiliary play-out spool which has been found suitable for introducing the time delay; and Fig. 3 is a worm's eye view of the parts shown in Fig. 2.

Referring first to Fig. 1, reel 10 mounted on rod 12 may be assumed as of the usual type comprising a braking mechanism enabling proper playing of the fish. In accordance with the invention, the rod, in addition to the reel, carries a stationary spool piece 14 detachably secured to the rod with its axis perpendicular to that of the rod at a point on the under-surface of the rod within convenient reaching distance of the handle 16. The spool piece (Fig. 2) is shown connected to the rod 12 through a bracket 18 fastened to the rod by means of wrappings 20, the bracket having bolted thereto an element 22, most suitably formed of spring metal, having downwardly bent end portions 22a frictionally engaged by the spool piece. The left-hand end of the bracket 18 is also bent downwardly to form a tongue 24 which with the staple 26, fixed to the bracket as by soldering, provides a clip serving a purpose hereinafter explained.

At the beginning of the fishing operation, the fishing line 28, 28a, which is guided on the fishing rod by the eyes 30, is payed out from the reel 10 to a degree which is largely optional with the fisherman. Thereafter, a predetermined length of the line, say, 50 or 60 feet thereof, is drawn inwardly by hand and wound on the spool piece. On completion of the winding, the spool piece, if removed for the purpose of the winding, is re-attached to the rod, and the line, after being passed between the tongue 24 and the staple 26, is secured within the jaws of the spring clip 32 carried at the end of the line 36 depending from the outrigger pole 34.

Clip 32, which is conventional and accordingly does not require description here, releases the fishing line when the line is momentarily tensioned by a strike with the result that the line assumes a position as indicated by the dotted line in Fig. 1. The momentary tension on the fishing line occasioned by the strike is also sufficient to free it from the clip 24, 26 so that the length of line on the spool piece is easily unwound therefrom by the fish as he makes off with the bait and hook. With all of the line unwound from the spool piece, the line is brought under tension by the reel 10 and the fish played as heretofore.

To avoid possible interference during playing of the fish, the spool piece once it has served its purpose, can be quickly pulled free of the spring bracket 22 and laid aside.

Having thus described and illustrated my invention, what I claim is:

The combination with a fishing rod having a reel thereon for paying out a fishing line, of a stationary spool member adapted to receive a predetermined length of the line, said spool member being detachably fastened to the rod with its axis perpendicular to that of the rod at a point on the under-surface of the rod within reaching distance of the handle end thereof and having clip means associated therewith whereby on use of the rod with an outrigger comprising the usual clip through which the fishing line is passed, the length of line carried on the spool member is prevented from being unwound therefrom until the line is released from the outrigger clip by a strike.

JOHN ABREY.

REFERENCES CITED

The following references are of record in the file of this patent:

UNITED STATES PATENTS

| Number | Name | Date |
| --- | --- | --- |
| 664,889 | Ogimura | Jan. 1, 1901 |
| 1,819,034 | Luellof | Aug. 18, 1931 |
| 2,180,781 | Taylor | Nov. 21, 1939 |
| 2,528,799 | Strong | Nov. 7, 1950 |